UNITED STATES PATENT OFFICE.

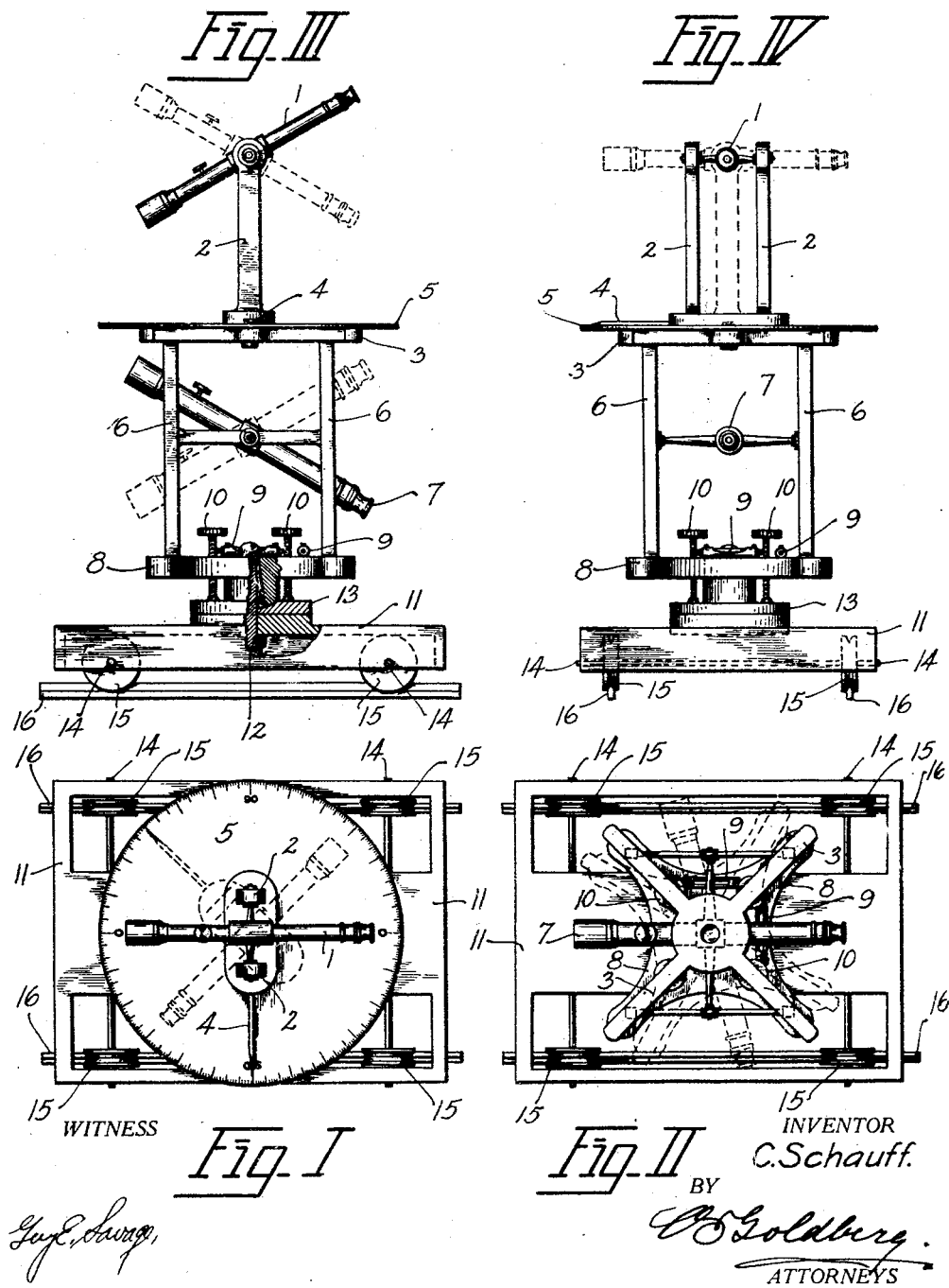

CHARLES SCHAUFF, OF OAK GROVE, OREGON.

THEODOLITE.

1,366,498.     Specification of Letters Patent.     Patented Jan. 25, 1921.

Application filed June 24, 1920. Serial No. 391,265.

*To all whom it may concern:*

Be it known that I, CHARLES SCHAUFF, a citizen of the United States, residing at Oak Grove, in the county of Clackamas and State of Oregon, have invented a new and useful Theodolite, of which the following is a specification.

My invention relates to improvements in theodolites in which two telescopes, independently rotatable about the same vertical axis, are mounted on a carriage for movement on rails, and in which the upper telescope is equipped for azimuth reading.

The objects of my invention are to support two telescopes in such a manner, that one observer may move the carriage on the rails and keep the lower telescope focused on a fixed point, while another observer on the upper telescope simultaneously focuses on some other object and furnishes azimuth readings at proper intervals. This instrument is especially intended for rangefinding purposes.

I attain these objects with the mechanism illustrated in the accompanying drawing, in which—

Figure I is a plan view of the entire apparatus;

Fig. II also, is a plan view, but with the upper telescope and the graduated dial omitted;

Fig. III is a side elevation of Fig. I with part of the lower vertical axis in section;

Fig. IV is an end elevation of Fig. I.

Similar numerals refer to similar parts throughout the several views.

The telescope 1 is pivotally secured in the standards 2. The latter are rotatably mounted in the spider 3 and carry a pointer 4 by means of which azimuth readings on the graduated dial 5 may be taken. The dial is rigidly attached to the spider 3. The standards 6 support the spider 3 and also, between them, the telescope 7, suitably mounted for elevation. The support for the standards 6 is furnished by a spider 8 which is equipped with spirit levels 9, the leveling screws 10, and held to the carriage 11 by means of a bolt 12. For horizontal adjustment the spider 8 and bolt 12 coöperate together on the ball-and-socket principle, as indicated in Fig. III, where it is shown that the spherical head of the bolt 12 presses on the spider 8 from above, while the counter thrust from below is exerted by the concave leveling plate 13.

The carriage 11 rests on the axles 14 of the wheels 15, and these again are movably set on the rails 16.

Pointer and zero point on the dial should preferably coincide when both telescopes are focused on the same object. Whatever object the upper telescope thereafter may sight, and however much the carriage may be shifted, providing the lower telescope retains its focus on the original object, the horizontal deviation of the upper telescope from the zero line is instantly ascertainable.

The dotted lines in Figs. I and IV refer to telescope 1 pointed in different directions.

In Fig. II an alternate position for the telescope 7 is shown.

Fig. III shows telescopes 1 and 7 at different elevations.

I claim:

1. In a theodolite, the combination of two telescopes a frame on which the telescopes are mounted for independent rotation about the same axis, means to support the said frame movably on rails, and means to adjustably secure said frame with said axis in vertical position.

2. In a theodolite, the combination of two telescopes a frame on which said telescopes are mounted for independent rotation about the same vertical axis, with a carriage to support said frame, and with rails to guide said carriage.

3. In a theodolite, the combination of two telescopes a frame on which the telescopes are mounted for independent rotation about the same vertical axis, a graduated dial attached to the frame, and a pointer attached to the upper telescope for azimuth readings on the graduated dial.

Signed by me at Portland, Oregon, this 18th day of June, 1920.

CHARLES SCHAUFF.